April 6, 1954

K. D. HAWKINS 2,674,471

JOINT FOR TUBES

Filed June 6, 1950

INVENTOR.
KENNETH D. HAWKINS

BY
Wm. H. Dean

AGENT

Patented Apr. 6, 1954

2,674,471

UNITED STATES PATENT OFFICE 2,674,471

JOINT FOR TUBES

Kenneth D. Hawkins, Chula Vista, Calif., assignor to The Ryan Aeronautical Co., San Diego, Calif., a corporation of California Application June 6, 1950, Serial No. 166,305

1 Claim. (Cl. 285—129)

My invention relates to a joint for tubes, more particularly for a joint for use in connecting tubular structures in aircraft engine exhaust conductors, or the like where high temperatures and pressures are a major problem, and the objects of my invention are:

First, to provide a joint for tubes having resilient annular connecting flanges providing an abutment connection for a pair of individual tubes, which efficiently retains fluids therein, due to the resiliency of said flanges, which tend to maintain intimate bearing surface contact with each other;

Second, to provide a joint for tubes which requires a minimum of space longitudinally of the axes of the tubes connected thereby;

Third, to provide a joint for tubes which is provided with means for adjusting the bearing pressure of the flanges secured to the connected tubes, whereby the flanges may be forced to resiliently conform to each other, providing an efficient gas seal;

Fourth, to provide a joint for tubes in which resilient pre-loaded abutted flanges tend to conform closely to each other when heated, due to the resilient stresses in the flanges;

Fifth, to provide a joint for tubes in which peripheral clamps engage annular spaced bead portions of tube connecting flanges, whereby the U-shaped cross-section clamp tends to force the annular spaced beads of the individual flanges toward each other and provide a resilient stress therein and a maximum of friction between said flanges when the clamps are tightened around said annular bead; and Sixth, to provide a joint for tubes of this class which is very simple and economical of construction, efficient in operation, and which will not readily deteriorate or get out of order.

Figure 1:
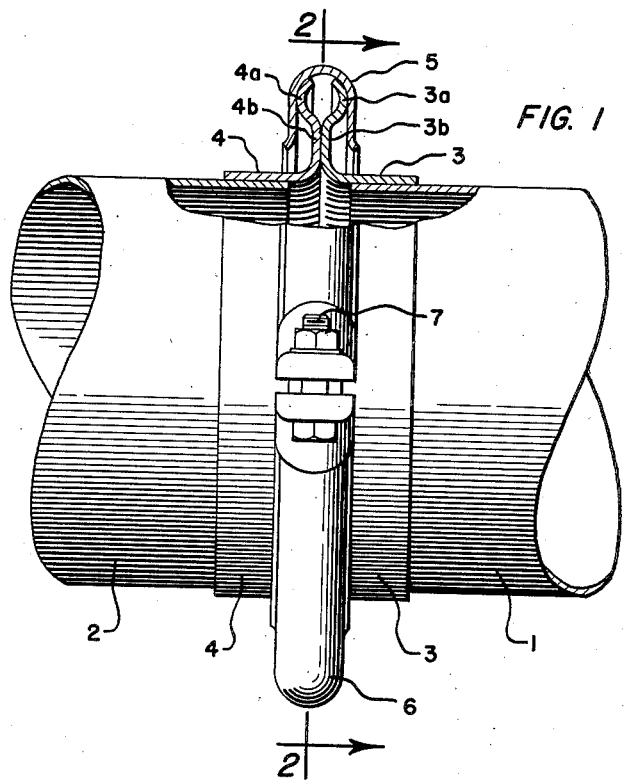
Figure 2:
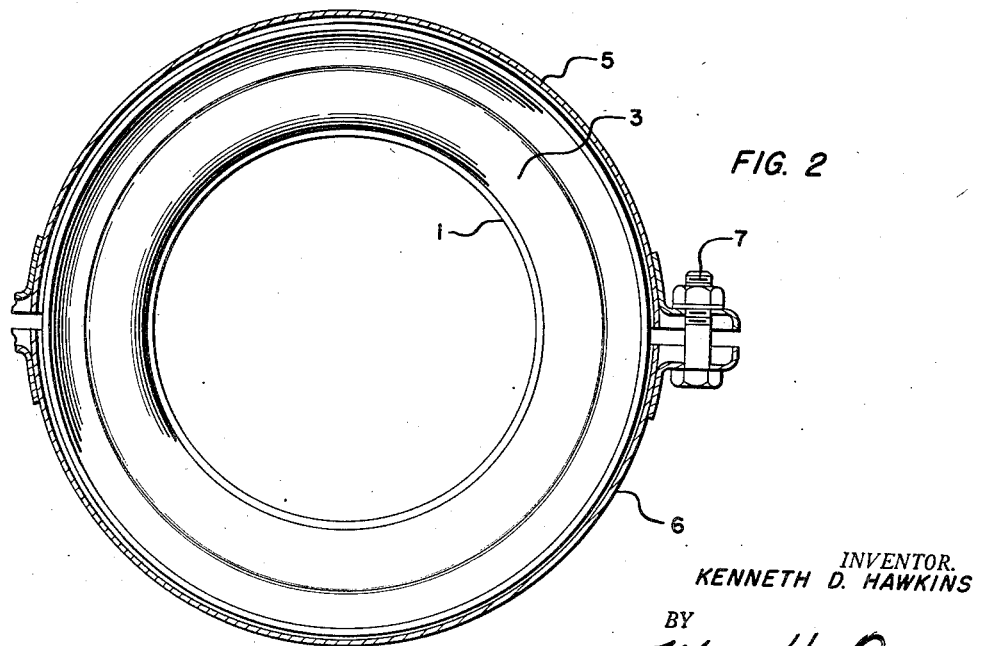

With these and other objects in view, as will appear hereinafter, my invention consists of certain novel features of construction, combination and arrangement of parts and portions, as will be hereinafter described in detail and particularly set forth in the appended claim, reference being had to the accompanying drawings and to the characters of reference thereon, forming a part of this application, in which:

Fig. 1 is a side elevational view of my joint for tubes, shown in connection with the ends of a pair of tubes, and showing portions broken away and in section to amplify the illustration; and Fig. 2 is a fragmentary sectional view, taken from the line 2—2 of Fig. 1.

Similar characters of reference refer to similar parts and portions throughout the several views of the drawings.

The tubes 1 and 2, flange members 3 and 4, clamp members 5 and 6, and the bolt 7, constitute the principal parts and portions of my joint for tubes.

The tubes 1 and 2, shown in Fig. 1 of the drawings, are connected by welding or any other suitable means to the flange members 3 and 4, respectively. These flange members 3 and 4, respectively, are annular and substantially L-shaped in cross-section, and are provided with opposed arcuate in cross-section annular bead portions 3a and 4a, which are spaced from each other, as shown in Fig. 1 of the drawings. Adjacent to these annular bead portions 3a and 4a are the bearing portions 3b and 4b, which provide an abutment for the flanges 3 and 4, which abutment forms a seal for fluids passing from one tube to the other, internally thereof.

The clamp members 5 and 6 are substantially U-shaped in cross-section, and are semi-circular with opposed flat parallel spaced wall portions engaging the opposed annular bead portions 3a and 4a, tending to force the same together, causing resilient stresses therein to force the bearing portions 3b and 4b tightly together. It will be noted that the U-shaped cross-section of the clamp members 5 and 6 is provided with flared edges, which facilitate the placement of the clamp members 5 and 6 over the opposed annular bead portions 3a and 4a of the flange members 3 and 4.

The bolts 7 adjustably interconnect opposite ends of the clamp members 5 and 6 for holding the same in secure engaged relationship with the annular bead portions 3a and 4a of the flange members 3 and 4.

The operation of my joint for tubes is substantially as follows::

When my joint for tubes is employed to connect the tubes 1 and 2 in axial alignment with each other, the clamp members 5 and 6, when secured by the bolts 7, force the annular bead portions 3a and 4a of the flanges 3 and 4, inwardly toward each other, causing resilient stresses to be set up within the outwardly extending portions of these flanges 3a and 4a, which forces the bearing portions 3b and 4b into intimate contact with maximum friction between said portions, providing an efficient seal and a rigid connecting structure for the tubes 1 and 2.

When exhaust gases or other light fluids are flowing in the tubes 1 and 2 under pressure, leakage through the joint is prevented by the bearing of the bearing portions 3b and 4b of the flanges 3 and 4, which is very intimate and maintained by the resilient stress in the flange members 3 and 4, caused by compression of the annular beads 3a and 4a within the U-shaped clamp members 5 and 6.

It will be noted that the intimate compressive bearing of the internal portion of the clamp members 5 and 6 against the annular beads 3a and 4a provides a secondary fluid seal which, in combination with the bearing of the portions 3b and 4b, provides a very efficient gas sealing joint for tubes. It will be noted that the engagement of the clamp members 5 and 6 with the annular bead portions 3a and 4a maintains the tubes 1 and 2 concentrically aligned with each other.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

In an engine exhaust pipe, a pair of axially aligned hollow tubes of a metal resistant to high temperatures, opposing identical flanges fixed to the adjacent ends of said tubes, a clamp generally U-shaped in cross section and having opposed parallel flat walls engaging and holding the flanges together, said clamp and said flanges both being of heat resistant metal and resilient, each of said flanges having an outwardly extending leg including a flat annular inner portion abutting the other, and a reversely curved peripheral portion substantially semi-circular in cross-section on each flange spaced from the other at the outer edges, said clamp having inner surfaces of an internal radius equal to the external radius of said peripheral portion and closely fitting the curved peripheral portions of the flanges and comprising a stop limiting relative movement of the flanges, the said parallel flat walls permitting limited relative movement of the flanges while maintaining said flat annular inner portions in tightly engaged sealing relationship, and whereby said clamp and said peripheral portions maintain contact with each other over wide curved areas to provide a secondary seal.

References Cited in the file of this patent
UNITED STATES PATENTS

| Number | Name | Date |
|---|---|---|
| 726,004 | Stein et al. | Apr. 12, 1903 |
| 1,243,438 | Morris | Oct. 16, 1917 |
| 1,376,216 | Mittinger | Apr. 26, 1921 |
| 2,451,941 | Glover | Oct. 19, 1948 |
| 2,489,587 | Rice | Nov. 29, 1949 |